June 24, 1947. C. A. ELLIS 2,422,661
BINOCULAR MAGNIFYING LENS HOLDER
Filed July 24, 1944
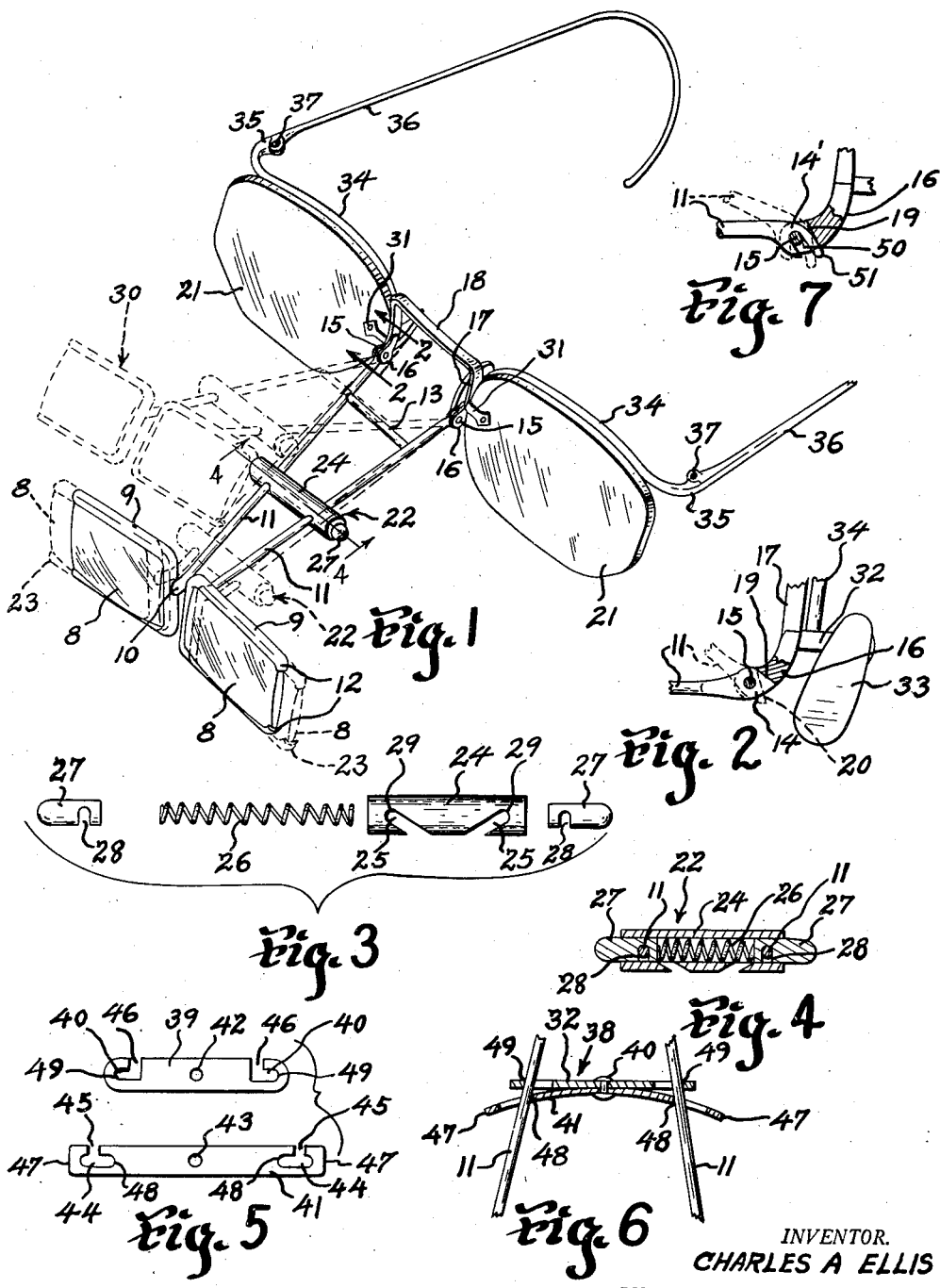
INVENTOR.
CHARLES A ELLIS
BY
Louis L. Gagnon
Attorney Patented June 24, 1947

2,422,661

UNITED STATES PATENT OFFICE 2,422,661

BINOCULAR MAGNIFYING LENS HOLDER

Charles A. Ellis, Southbridge, Mass., assignor to American Optical Company, Southbridge, Mass., a voluntary association of Massachusetts Application July 24, 1944, Serial No. 546,301

10 Claims. (Cl. 88—41)

This invention relates to binocular magnifiers and has particular reference to a novel attachment for such magnifiers to an ophthalmic mounting and novel means of adjusting said magnifiers relative to each other.

One of the principal objects of the invention is to provide simple and effective means in binocular loops or magnifiers for quickly and easily altering the distance between said magnifiers and for retaining said magnifiers in said adjusted relation.

Another object is to provide holding means for a pair of magnifiers of the character described which may be detachably secured to an ophthalmic mounting.

Another object is to provide a support for binocular magnifiers of the above character which may be raised or lowered relative to the ophthalmic mounting.

Another object is to provide a novel arrangement for adjusting the distance between the lenses which may be conveniently operated by one hand of the individual and which will retain its adjusted position when released.

Other objects and advantages of the invention will become apparent from the following description taken in connection with the accompanying drawings and it will be apparent that many changes may be made in the details of construction and arrangement of parts without departing from the spirit of the invention as expressed in the accompanying claims. I, therefore, do not wish to be limited to the exact details of construction and arrangement of parts shown and described as the preferred forms only have been given by way of illustration.

Referring to the drawings:

Fig. 1 is a perspective view of the preferred form of the invention;

Fig. 2 is a slightly enlarged partial sectional view taken as on line 2—2 of Fig. 1 and looking in the direction indicated by the arrows;

Fig. 3 is an exploded view of the preferred means for retaining the magnifier supports and magnifiers in adjusted positions;

Fig. 4 is a sectional view taken as on line 4—4 of Fig. 1;

Fig. 5 illustrates a modified form of the invention showing the parts in disassembled relation with each other;

Fig. 6 is a sectional view illustrating the parts of Fig. 5 in assembled relation with each other and with the magnifier supports;

Fig. 7 is a view generally similar to Fig. 2 of a further modification of the invention.

Referring more particularly to the drawings wherein like characters of reference designate like parts throughout the several views, the device embodying the invention comprises a pair of magnifying lenses 8 each held in a respective frame 9 carried by the forward ends 10 of resilient bars or supports 11.

The frames 9 are of U-shaped formation having the upper and lower branches thereof grooved inwardly so as to receive suitably beveled edges or the like formed on the lenses 8 whereby said lenses may be slid in a sidewise direction into assembled relation with the frames. The lenses 8 may be secured in the frame portions 9 by bending the outer ends 12 thereof toward each other as illustrated in Fig. 1. The ends 10 of the resilient bars or supports 11 are preferably secured to the base of the U-shaped frames 9 by soldering, welding, or the like. The said bars or supports 11 are joined with each other by a tie rod or the like 13 which is preferably secured to said bars or supports 11 by soldering, welding, or the like. The said tie rod 13 is located adjacent the ends of the bars 11 opposite the frame portions 9, with the extreme ends of said bars 11 each being provided with a perforated ear 14, see Fig. 2. The perforated ears are pivotally connected by means of a pivot pin or the like 15 to a hinge strap 16 carried by the depending portions 17 of a bridge member 18 of a conventional ophthalmic mounting. The hinge straps 16 are secured to the depending portions 17 of the bridge by soldering, welding, or the like. The said straps 16 are provided with an inner surface 19 against which a flattened edge 20, formed on the pivoted ends of the bars 11, is adapted to engage to limit the downward movement of said bars 11 and to support the magnifiers 8 in alignment with the line of straight ahead vision through the lenses 21.

A slide clamp such as illustrated at 22 is carried by the bars 11 and is adapted to vary the distance between the lenses by movement of said slide clamp 22 toward or away from the bridge member 18. This is diagrammatically illustrated by the dash lines 23 in Fig. 1. When the slide clamp 22 is moved toward the lenses, as illustrated by the dash lines 23 in Fig. 1, the distance between said lenses will be increased. When moved in the opposite direction as shown by the full lines, the distance between the lenses will be decreased. The effective point about which the lenses are swung is substantially adjacent the ends of the tie rod 13 thereby causing the distance between the hinge straps 16 to be unaltered.

The slide clamp, as shown in Figs. 1, 3, and 4, comprises a tubular member 24 having diverging slots 25 formed in the side wall thereof and communicating with the bore of the tube. The slots 25 are adapted to receive the resilient bars or supports 11. A coil spring 26 is positioned internally of the tubular member 24, as best illustrated in Fig. 4, and is compressed by slide blocks 27 positioned in the opposed ends of the tubular member 24. The said slide blocks 27 are each provided with a notch 28 adapted to receive the bars or supports 11. The parts are assembled by exerting a pressure on the exposed ends of the slide blocks 27 of an amount sufficient to position the mouth of the notches 28 in alignment with the diverging slots 25. The bars 11 may then be positioned in the respective diverging slots 25 and will spring outwardly and assume a nested relation with the notches 28. When pressure is released, the slide blocks 27 will urge the resilient bars or supports 11 outwardly to cause them to engage the respective bases 29 of the slots 25 with the resilient means 26 tending to cause the slide blocks 27 to lock the tubular member 24 in adjusted position on the bars 11. By compressing the slide blocks 27 slightly to relieve the friction grip of the bases 29 of the slots 25 with the bars 11, it is apparent that the said slide clamp 22 may be quickly and easily slid longitudinally of the bars 11 to alter the distance between the lenses 8.

The clamping effect is brought about by the spring 26 causing the slide blocks to wedge the bars 11 between the walls of the notches 28 and the bases 29 of the slots 25. It is to be understood that the notches 28 and the slots 25 are so dimensioned as to permit the bars or supports 11 to slide relatively freely therethrough when the wedging action of the blocks 27 is released.

The entire binocular loop or magnifier attachment assembly may be raised or lowered about the pivots 15, as illustrated by the dash lines 30 in Fig. 1. In this manner, the lenses 8 may be moved into or out of the field of direct vision.

The ophthalmic mounting illustrated in Fig. 1, as previously stated above, is of a conventional type embodying lenses 21 secured to the depending portions 17 of the bridge member by lens straps or the like 31. The said bridge member is provided with rearwardly extending nose pad supporting arms 32, see Fig. 2, to which suitable nose pads 33 may be rigidly or loosely connected. The said nose pad supporting arms 32 have secured thereto long and slender temple supports 34 which are shaped to follow substantially the upper contour shape of the lenses. The said temple supports 34 terminate in temple hinge connections 35 to which suitable temples 36 are pivotally connected as illustrated at 37.

It is to be understood that the binocular magnifier support may be attached to any commercial type of ophthalmic mounting, goggle or the like, either of rimless or frame type.

In Figs. 5 and 6, there is illustrated a slightly modified form of slide clamp 38 simulating the slide clamp 22. The slide clamp 38 comprises a plate-like member 39 having L-shaped slots 40 formed adjacent the opposed ends thereof. There is secured to said plate 39, by a rivet or other suitable means 40, a blade like spring 41. The rivet 40 extends through suitable openings 42 and 43 formed centrally of the respective members 39 and 41. The blade spring 41 is provided with longitudinal slots 44 adjacent the opposed ends thereof in which the bars or supports 11 are adapted to be positioned as shown in Fig. 6. The member 41, adjacent the slotted ends 44, is provided with open mouth portions 45 communicating with said slots 44 whereby said mouth portions 45 may be aligned with the opened ends 46 of the L slots 40 in the plate 39 whereby the bars 11 may be inserted in the respective slotted portions 40 and 44. This is brought about by cupping the blade spring 41, as shown in Fig. 6, by exerting pressure on the opposed ends 47 thereof simulating the pressure exerted on the ends of the slide blocks 37 as previously described above. When the pressure on the opposed ends 47 of the blade spring 41 is released, the inner ends 48 of the slotted portions 44 will move into side surface contact with one side of the respective bars or supports 11 and will force said bars into binding relation with the outer ends 49 of the slots 40 thereby causing the said slide clamp to grip the bars 11. This action is brought about through the tendency of the blade spring 41 to flatten or to return to its initial set when pressure is released on the ends 47. When it is desired to move the slide clamp 38 longitudinally of the bars 11, pressure is exerted on the ends 47 thereby relieving the clamping action between the edges 48 and 49 respectively whereby the said clamp 38 will be free to move longitudinally of said bars 11. When in desired adjusted position pressure is released on the ends 47 and the spring 41 will then bring about a clamping action between said spring and plate to hold the slide clamp in said position.

In Fig. 7, there is illustrated a further modification where instead of providing the inner ends of the bars 11 with perforated portions 14, as shown in Fig. 2, the said inner ends 14′ are recessed or slotted as shown at 50 to receive the pins 15, the said recess being such as to form a bifurcated end with one of the branches of the bifurcations 51 being adapted to engage the base 19 of the hinge strap 16 to limit the downward movement of the bars 11. It is to be noted that the bars 11 may be swung upwardly about the pins 15 in a similar manner to the hinged construction illustrated in Fig. 2 but in addition thereto the said bifurcated ends 14 may be detached from or attached to the pins 15 by merely sliding the bifurcations inwardly or outwardly from between the spaced ears of the strap 16.

It is to be noted that the said straps 16, as shown in Fig. 1, are provided with spaced ears between which the portions 14 and 14′ are adapted to be positioned and held therein by the pin members 15.

From the foregoing description, it will be seen that simple, efficient, and economical means have been provided for accomplishing all of the objects and advantages of the invention.

Having described my invention, I claim:

1. A binocular attachment for an ophthalmic mounting embodying spaced bar-like members joined by a tie member adjacent one end thereof and having connection means adjacent said ends, a magnifying lens supported adjacent the opposite ends, a tubular member having spaced slots in a wall thereof supported on said bar-like members with said bar-like members lying in the respective slots, slide blocks mounted in the opposite ends of said tubular member each having a notch therein adapted to communicate with the slots in the tubular member, in one position of adjustment, to receive a respective bar-like member and resilient means for urging said slide blocks in a direction outwardly of said tubular member for bringing about a wedging action between a side wall of the slots and a wall portion of the notches of the respective slide blocks with said bar-like members.

2. A device of the character described comprising a supporting frame embodying spaced bar-like members, lens-holding members adjacent one end of said bar-like members for supporting lenses, a member having spaced slideways therein in which the bar-like members are positioned, resilient means extending in a direction longitudinally of and carried by said member for resiliently forcing engagement portions adjacent each end of said resilient means into engagement with and for retaining said bar-like members against motion under the normal action of the resilient means with said portions being movable toward each other an amount sufficient to relieve the retaining action and thereby permit the said member and resilient means carried thereby to be substantially freely moved longitudinally of said bar-like members.

3. A device of the character described comprising a supporting frame embodying a pair of converging bar-like members, a pair of lens-holding members adjacent the converging ends of said bar-like members for supporting lenses, a member having spaced slideways therein in which the bar-like members are positioned, said slideways being a distance apart less than the distance apart of the diverged ends of the bar-like members, resilient means extending in a direction longitudinally of and carried by said member for resiliently forcing engagement portions adjacent each end of said resilient means into engagement with and for retaining said bar-like members against motion under the normal action of the resilient means, with said portions being movable toward each other an amount sufficient to relieve the retaining action and thereby permit the said member and resilient means carried thereby to be substantially freely moved longitudinally of said bar-like members to change the angle of convergence and thereby alter the distance between the lens-holding members.

4. A device of the character described comprising a supporting frame embodying a pair of angularly disposed bar-like members, a pair of lens-holding members adjacent one end of said bar-like members for supporting lenses, attachment means adjacent the other end, an intermediate member having spaced slideways therein in which the bar-like members are positioned, said slideways being spaced apart a distance other than the distance between the ends of the bar-like members bearing attachment means, resilient means extending in a direction longitudinally of and carried by said member for resiliently forcing engagement portions adjacent each end of said resilient means into engagement with and for retaining said bar-like members against motion under the normal action of the resilient means, with said portions being movable toward each other an amount sufficient to relieve the retaining action and thereby permit the said member and resilient means carried thereby to be substantially freely moved longitudinally of said bar-like members to change the angular disposition of the bar-like members and thereby alter the distance between the lens-holding members.

5. A device of the character described comprising an ophthalmic mounting and a supporting frame embodying a pair of converging bar-like members one end of which is secured to the mounting, a pair of lens-holding members adjacent the other end of said bar-like members for supporting lenses, a member having spaced slots therein in which the bar-like members are positioned, said slots being spaced apart a distance other than the distance between the ends of the bar-like members secured to the mounting, resilient means extending in a direction longitudinally of and carried by said member for resiliently forcing engagement portions adjacent each end of said resilient means into engagement with and for retaining said bar-like members against motion under the normal action of the resilient means, with said portions being movable toward each other an amount sufficient to relieve the retaining action and thereby permit substantially free movement of said member and resilient means carried thereby longitudinally of said bar-like members to change the angle of convergence and thereby alter the distance between the lens-holding members.

6. A device of the character described comprising an ophthalmic mounting and a supporting frame embodying spaced bar-like members secured to the mounting at one end, a pair of lens-holding members adjacent the other end of said bar-like members for supporting lenses, a member having spaced slideways therein in which the bar-like members are positioned, spring actuated means extending in a direction longitudinally of and carried by said member for urging engagement portions adjacent each end of said spring actuated means into engagement with and for retaining said bar-like members against motion under the normal action of the spring actuated means with said portions being substantially freely movable toward each other an amount sufficient to relieve the retaining action and thereby permit the said member to be moved longitudinally of said bar-like members.

7. In a device of the character described the combination of an ophthalmic mounting embodying a bridge member having connection means adjacent the opposed sides of the bridge and extending forwardly, a pair of converging bar-like members, each having one end connected to the respective connection means of the bridge member, a pair of lens-holding members adjacent the other end of said bar-like members for supporting lenses, a member having spaced slideways therein in which the bar-like members are positioned, said slideways being spaced apart a distance other than the distance apart of the connected ends of the bar-like members, resilient means extending in a direction longitudinally of and carried by said member for resiliently forcing engagement portions adjacent each end of said resilient means into engagement with and for retaining said bar-like members against motion under the normal action of the resilient means, with said portions being movable toward each other an amount sufficient to relieve the retaining action and thereby permit substantially free movement of said member and resilient means carried thereby longitudinally of said bar-like members to change the angle of convergence and thereby alter the distance between the lens-holding members.

8. A device of the character described comprising a supporting frame embodying spaced bar-like members, a pair of lens-holding members adjacent one end of said bar-like members for supporting lenses, a member having spaced slideways therein in which the bar-like members are positioned, a resilient member extending in a direction longitudinally of and carried by said member, having slots adjacent either end in which the bar-like members are positioned, said slots being spaced apart a distance greater than the distance spacing the slideways on the other member whereby said bar-like members will be resiliently retained against motion under the normal action of the resilient member with its outer end portions being movable toward each other an amount sufficient to relieve the retaining action and thereby permit substantially free movement of the first member and resilient member carried thereby longitudinally of said bar-like members.

9. A device of the character described comprising a supporting frame embodying a pair of converging bar-like members, a pair of lens-holding members adjacent the converging ends of said bar-like members for supporting lenses, a member having spaced slideways therein in which the bar-like members are positioned, said slideways being spaced apart a distance other than the distance spacing the diverged ends of the bar-like members, a resilient member extending in a direction longitudinally of and carried by said member and having slots therein in which the bar-like members are positioned and with said slots being spaced a distance greater than the spacing of the slideways whereby said bar-like members will be resiliently retained against motion under the normal action of the resilient member, with its ends being movable toward each other an amount sufficient to relieve the retaining action and thereby permit the first member and resilient member carried thereby to be substantially freely moved longitudinally of said bar-like members to change the angle of convergence and thereby alter the distance between the lens-holding members.

10. In a device of the character described for use with an ophthalmic mounting, said device comprising a pair of bar-like members having end portions provided with connecting means for attachment to said ophthalmic mounting and to extend convergingly forwardly thereof, each of said bar-like members having lens holding means adjacent the forward ends thereof, an intermediate member having spaced slots therein in which the bar-like members are positioned and having a wall portion for engaging one side of the respective bar-like members in said slot, a resilient member longitudinally thereof and carried by said intermediate member also having spaced slots in which the bar-like members are positioned and having a wall portion for engaging the opposed side of said bar-like member, the distance spacing the slots of the resilient member being greater than the distance spacing the slots in the intermediate member, which slots are spaced a distance other than the distance spacing the end portions of the bar-like members having connection means, the wall portions of the slots in the intermediate and resilient member being forced into binding gripping relation with said bar-like members under the normal resilient action of the resilient member, with the end portions of the resilient member being compressible toward each other an amount sufficient to relieve the said clamping action of the wall portions of the slots whereby the intermediate member may be relatively freely moved longitudinally of the bar-like members so as to change their angle of convergence and thereby alter the distance between the lens-holding means.

CHARLES A. ELLIS.

REFERENCES CITED

The following references are of record in the file of this patent:

UNITED STATES PATENTS

| Number | Name | Date |
| --- | --- | --- |
| 1,635,062 | Tully | July 5, 1927 |
| 1,033,119 | Pixley | July 23, 1912 |
| 974,950 | Carter | Nov. 8, 1910 |
| 2,017,233 | Chester | Oct. 15, 1935 |